United States Patent [19]

Yera et al.

[11] Patent Number: 5,435,676
[45] Date of Patent: Jul. 25, 1995

[54] TWO-STAGE BROACHING OF ENGINE BLOCK BEARINGS

[75] Inventors: Harvey J. Yera, Richmond; Donald W. Mast, Rochester, both of Mich.

[73] Assignee: National Broach & Machine Company, Mt. Clemens, Mich.

[21] Appl. No.: 183,359

[22] Filed: Jan. 19, 1994

Related U.S. Application Data

[63] Continuation-in-part of Ser. No. 967,291, Oct. 27, 1992.

[51] Int. Cl.$^6$ .............................. B23D 37/22
[52] U.S. Cl. .................... 409/244; 407/18; 409/265; 409/299
[58] Field of Search ............... 409/244, 265, 299, 59; 407/13, 15, 16, 18, 19

[56] References Cited

U.S. PATENT DOCUMENTS

| | | | |
|---|---|---|---|
| 1,197,132 | 9/1916 | Lapointe | 407/18 |
| 1,318,537 | 10/1919 | Bunting | 407/18 |
| 2,215,616 | 9/1940 | Lapointe et al. | 407/18 |
| 2,292,900 | 8/1942 | Schmidt | 29/95.1 |
| 2,314,160 | 3/1943 | Phaneuf | 407/18 |
| 2,487,757 | 11/1949 | Iversen | 29/95.1 |
| 2,644,369 | 7/1953 | Praeg | 90/10 |
| 3,178,800 | 4/1965 | Psenka | 29/95.1 |
| 4,498,361 | 2/1985 | Grace | 76/101 |
| 5,224,804 | 7/1993 | Shepley | 409/244 |

FOREIGN PATENT DOCUMENTS

| | | |
|---|---|---|
| 0300677 | 7/1988 | European Pat. Off. . |
| 2029870 | 11/1970 | France . |
| 2178425 | 3/1973 | France . |
| 66183 | 3/1926 | Sweden . |
| 551098 | 4/1942 | United Kingdom . |
| 795768 | 9/1978 | U.S.S.R. . |
| 1225716A | 2/1984 | U.S.S.R. . |

*Primary Examiner*—Z. R. Bilinsky
*Attorney, Agent, or Firm*—Barnes, Kisselle, Raisch, Choate, Whittemore & Hulbert

[57] ABSTRACT

A method and apparatus for broaching a series of axially aligned and spaced bores in which a first broach is provided for broaching in an initial operation. The first broach has circumferentially extending cutting teeth. The first broach also has arcuately spaced, longitudinally extending grooves which cross the cutting teeth and divide the cutting teeth into arcuate segments. Broach guides in the spaces between bores have ribs arranged in the same arcuately spaced relation as the grooves about an axis coinciding with the aligned axes of the bores. The first broach is advanced through the bores with the ribs slidably received in the grooves to guide the first broach and the cutting segments, broaching arcuately spaced sectors of the bores but leaving unbroached ridges therebetween. A second broach broaches the ridges left by the first broach.

23 Claims, 3 Drawing Sheets

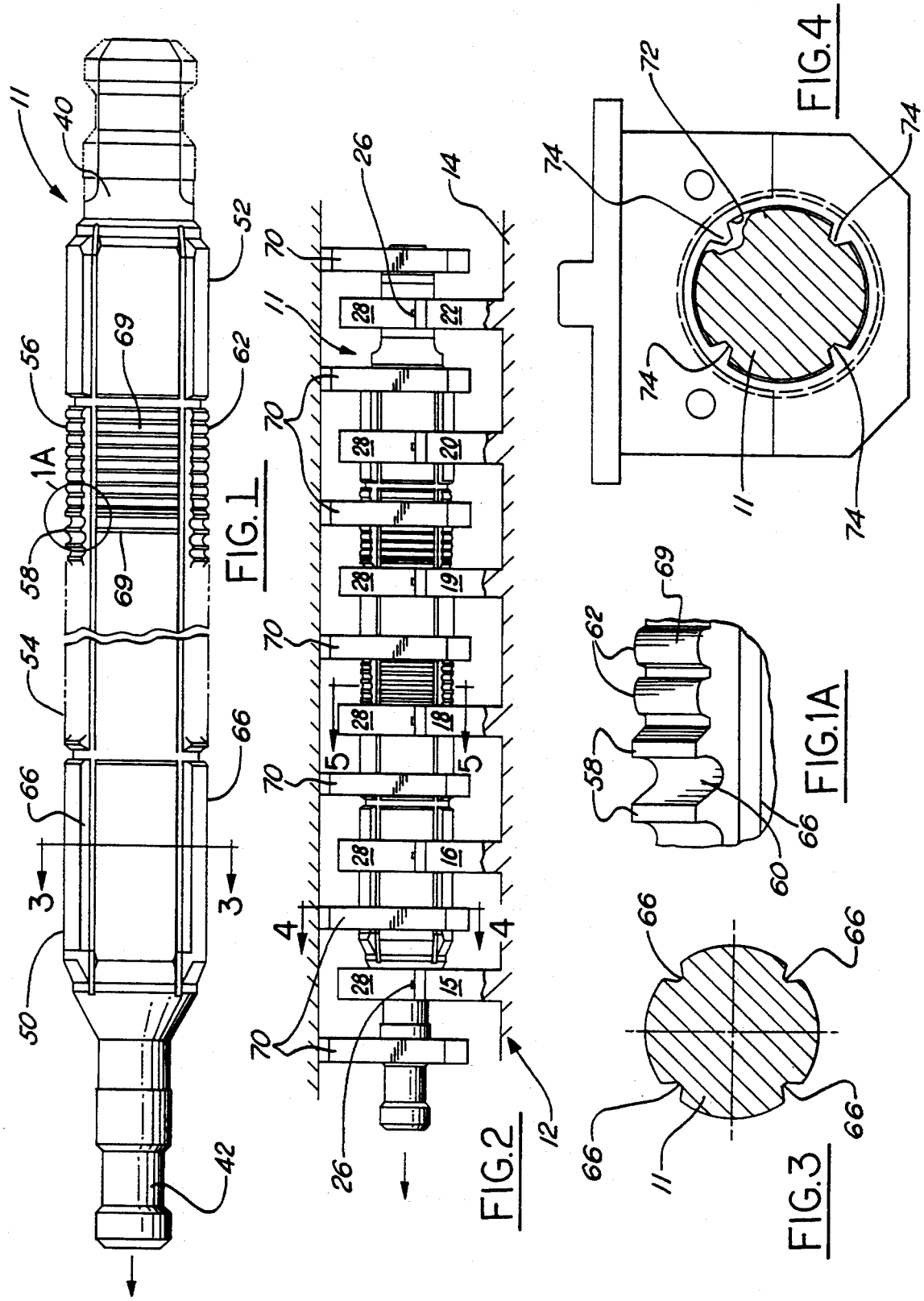

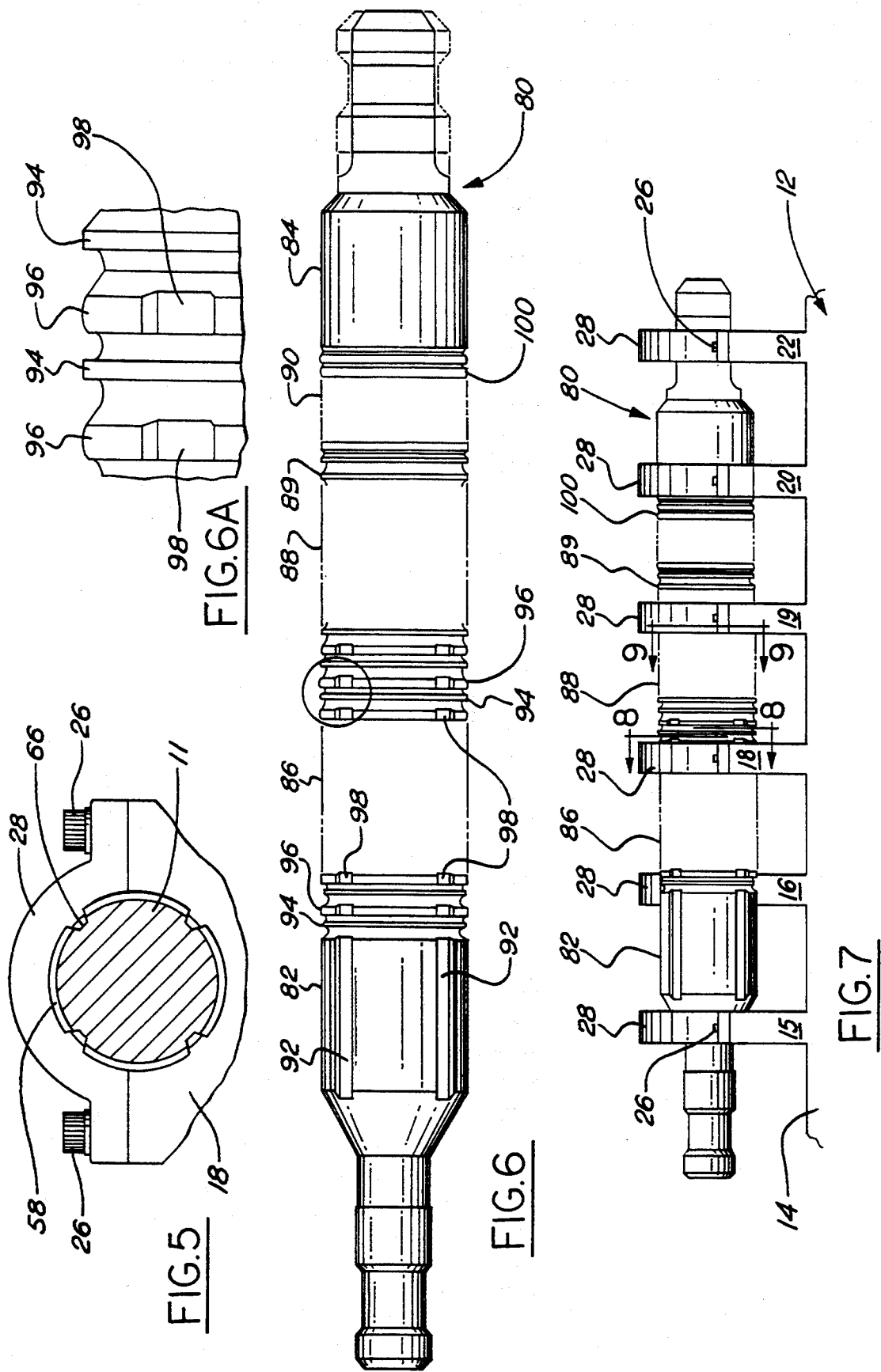

TWO-STAGE BROACHING OF ENGINE BLOCK BEARINGS

REFERENCE TO RELATED APPLICATION

This application is a continuation-in-part of copending application, Ser. No. 07/967,291, filed Oct. 27, 1992.

This invention relates generally to broaching and refers more particularly to broaches for, and a method of, broaching the aligned crankshaft bearing bores in an engine block.

BACKGROUND AND SUMMARY

When broaching a series of aligned bearing bores, such as the crankshaft bearing bores of an engine block, care must be taken to insure that the bores are cut true, that is, that they are round and in line. The problem is particularly troublesome when the bearings are formed of different materials having different machining characteristics. As an example, the crankshaft bearings of a cast aluminum engine block may have ductile iron bearing caps, so that one-half of each bearing is aluminum and one-half is iron. The aluminum portion of each bearing is softer and gummier and prone to tearing, whereas the ductile iron bearing caps are abrasive and have a higher cutting force constant. This causes the broach to stray off line and push into the softer aluminum material. As a result, the broach may cut holes that are off line and egg-shaped rather than round. Also, the forces generated by the broaching process may cause the bearing caps to deflect during broaching, causing an out-of-round condition in the final bores.

In accordance with the present invention, as shown in the embodiment about to be described, a plurality of broach guides are aligned with the bores to be broached. When the broach is moved through the bores, the path of the broach is controlled by the guides. Preferably, the guides are positioned in the spaces between the bores.

More specifically, the bores are broached in two stages. In the first stage, a broach having arcuately spaced, longitudinal grooves which cross the cutting teeth and divide them into arcuate cutting segments is employed. The broach guides have a plurality of ribs arranged in the same arcuately spaced relation as the grooves about an axis coinciding with the aligned axes of the bores. When the broach is advanced through the bores, the ribs are slidably received in the grooves to guide the broach so that the cutting teeth segments broach arcuately spaced sectors of the bores but leave unbroached ridges therebetween. Thereafter, in a second stage, a second broach broaches the ridges left in the first stage.

Preferably, the second broach has pilot teeth for guiding on the arcuately spaced sectors broached in the first stage. These pilot teeth have reliefs to clear the ridges. Cutting teeth are provided which are dimensioned to clear the sectors broached in the first stage and to broach the ridges left in the first stage.

One object of this invention is to provide broaches, and a method of broaching, having the foregoing features.

Another object is to provide broaches which are rugged and durable in use.

Other objects, features and advantages of the invention will become more apparent as the following description proceeds, especially when considered with the accompanying drawings.

BRIEF DESCRIPTION OF THE DRAWINGS

FIG. 1 is an elevational view of a broach constructed in accordance with the invention, and employed in the first stage of the practice of the method of the invention.

FIG. 1A is an enlargement of the portion of FIG. 1 shown within the circle 1A.

FIG. 2 is a side elevational view showing the broach of FIG. 1 being pulled through the aligned bearing bores for the crankshaft of an engine block to broach the bores in sequence in the first stage of the practice of the method of this invention, and also showing broach guides between the bearing bores for guiding the path of the broach.

FIG. 3 is a sectional view taken on the line 3—3 in FIG. 1.

FIG. 4 is a sectional view taken on the line 4—4 in FIG. 2.

FIG. 5 is a sectional view taken on the line 5—5 in FIG. 2.

FIG. 6 is an elevational view of another broach constructed in accordance with the invention and employed in the second stage of the practice of the method of this invention.

FIG. 6A is an enlargement of the portion of FIG. 6 shown in the circle 6A.

FIG. 7 is a side elevational view showing the broach of FIG. 6 being pulled through the aligned bearing bores.

DETAILED DESCRIPTION

Figure 8:
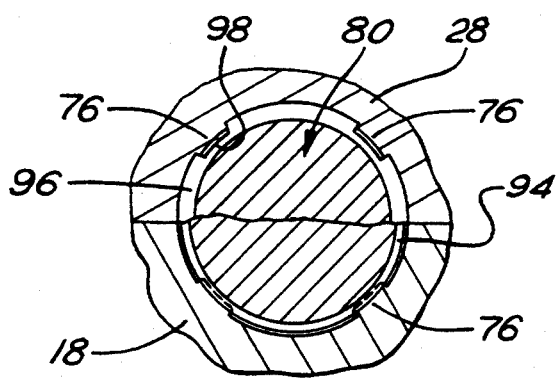
FIG. 8 is a sectional view taken on the line 8—8 in FIG. 7.
Figure 9:
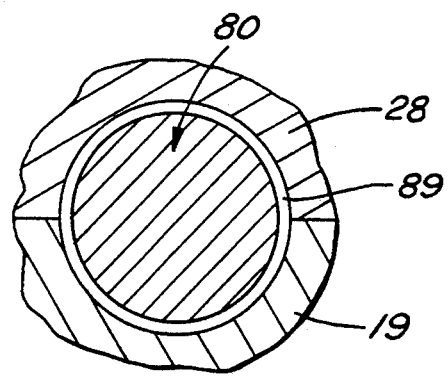
FIG. 9 is a sectional view taken on the line 9—9 in FIG. 7.

Referring now more particularly to the drawings, and especially to FIGS. 1–5, the broach 11 is used to broach the bearing bore for the crankshaft of an engine block 12. The engine block 12 comprises in this instance an aluminum casting 14 having a plurality of spaced bearing formations 15, 16, 18, 19, 20 and 22, each shaped with a semi-circular recess 24 forming one-half of a bearing bore 25. Secured to each bearing formation by fasteners 26 is a bearing cap 28 of ductile iron having a semi-cylindrical recess 27 providing the other half of the bearing bore. The bearing bores 25 are cylindrical, axially spaced, and aligned, and each is formed one-half of aluminum and one-half of ductile iron.

The broach 11 is a roughing broach and comprises an elongated, solid, unitary draw bar 40 having a pull head 42 at one end for connection to a power device such as a hydraulic piston-cylinder assembly (not shown) for pulling the broach through the bearing bores.

The broach 11 has a cylindrical front piloting section 50 and a cylindrical rear piloting section 52. Between the front and rear piloting sections are a broaching section 54 and a burnishing section 56. The broaching section has a plurality of axially spaced, circumferentially extending circular cutting teeth 58 separated by circumferentially extending gullets 60.

The burnishing section 56 is between the broaching section 54 and the rear piloting section 52 and has a plurality of axially spaced, circumferentially extending circular burnishing teeth 62 which have rounded crests to pack or compress the material forming the bores after they have been cut by the cutting teeth 58. The burnishing section is not always employed in rough cutting and in some instances may be dispensed with. The diameter of the cutting teeth and of the burnishing teeth is slightly greater than the diameter of the piloting sections 50 and 52 and greater than the initial diameter of the bores so that the teeth will cut the bores and the piloting sections will clear the bores.

The broach 11 has several, in this instance four, equally circumferentially spaced, longitudinally extending grooves 66 which run through the front piloting section 50, the broaching and burnishing sections 54 and 56 and the rear piloting sections 52. The grooves 66 are continuous and cut across the cutting and burnishing teeth, dividing them into four arcuate segments 69.

Broach guides 70 are provided in the spaces between the bearing bores 25 and may also be provided beyond both ends of the line of bearing bores. The broach guides in this instance are identical and each has a central opening 72 which is circular except for four equally spaced guide ribs 74 which project radially inwardly from the opening. These ribs have the same arcuately spaced relation as the grooves 66 in the broach 11. The central axes of the openings 72 in the broach guides are aligned with the aligned axes of the bores 25 in the bearing block.

The diameter of the guide openings 72 is greater than the maximum diameter of the broach so as to clear the broach as it is passed through the openings (see FIG. 4). The radially inner surfaces or crests of the ribs 74 are the same diameter as the bottoms of the grooves 66 in the broach.

In operation, and in the first stage of the method, the broach 11 is pulled through the aligned openings 72 in guides 70 and bearing bores 25. The crests of the ribs 74 of the guide openings 72 engage the bottoms of the grooves 66 in the broach to guide the broach. The piloting sections 50 and 52 and teeth 58 and 62 on the broach 11 clear, and do not contact, the openings 72 in the spaces between the ribs.

As the broach passes through the bores 25, the segments 69 of the cutting teeth 58 in the spaces between the grooves 66 cut the bores, leaving the bores with uncut ridges 76. The segments of burnishing teeth 62 between grooves 66 pack or compress the cut sectors of the bores, leaving the ridges 76 untouched.

Figure 10A:
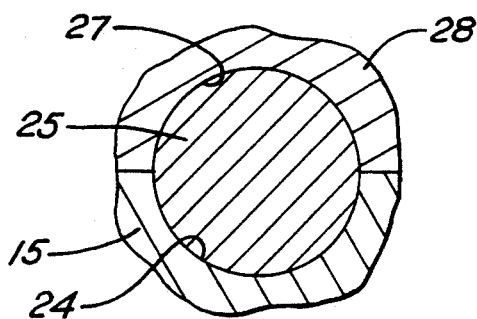
FIGS. 10A–10D show one of the bearing bores in various different conditions, FIG. 10A showing the bore before broaching, FIG. 10B showing the bore after broaching by the broach of FIG. 1 in the first stage, FIG. 10C showing the bore after initial broaching by the broach of FIG. 6 in the second stage, and FIG. 10D showing the bore after final broaching by the broach of FIG. 6 in the second stage.
Figure 10B:
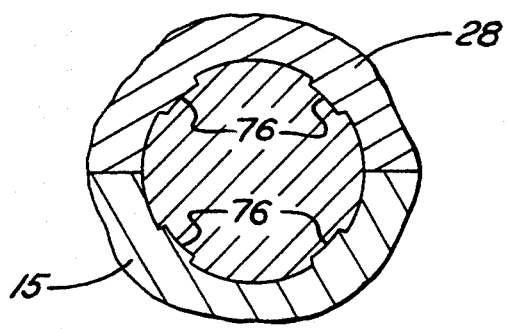

FIG. 10A shows one of the bearing bores before it is broached. FIG. 10B shows the same bearing bore after it has been broached by the broach 11.

Referring now to FIGS. 6–10D, a second or finishing broach 80 is next employed in a second stage. The broach 80 has a front piloting section 82 and a rear piloting section 84 and between the front and rear piloting sections are three cutting sections 86, 88 and 90. The front piloting section 82 is cylindrical except for four equally, circumferentially or arcuately spaced, longitudinally extending grooves 92. The arcuate spacing of grooves 92 is the same as grooves 66 in broach 11. This front piloting section 82 is dimensioned to have a close sliding fit and hence guide in the portions or sectors of the bearing bores 25 cut in the first stage. The grooves 92 are dimensioned to clear the ridges 76 left in the bores in the first stage.

The first cutting section 86 has a plurality of axially spaced, circumferentially extending circular cutting teeth 94, with circumferentially extending circular pilot teeth 96 in the spaces between the cutting teeth. The pilot teeth 96 are of the same diameter as the front piloting section of the broach, to guide in the portions of the bores cut in the first stage. The pilot teeth 96 have notches 98 which are axially aligned with the grooves 92 in the front piloting section 82 and dimensioned to clear the ridges 76.

Figure 10C:
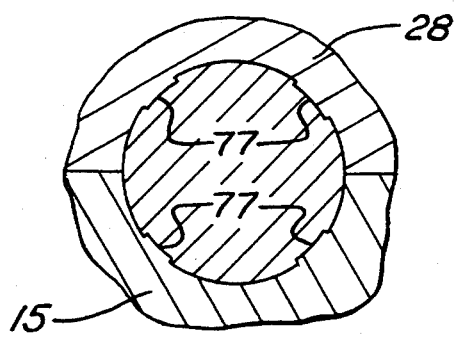
Figure 10D:
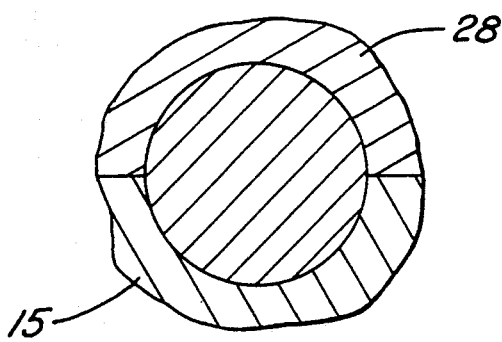

The cutting teeth 94 are circumferentially continuous, that is, they are not notched, and they are of a diameter less than the diameter of the pilot teeth 96 but greater than the diameter of the bottoms of the notches 98 so that they will not cut on the arcuate sectors of the bores broached by broach 11, but will cut much if not all of the ridges 76 left in the first stage (see FIG. 10C where partially cut ridges are designated 77).

The second cutting section 88 has a plurality of axially spaced, circumferentially extending circular cutting teeth 89 which are circumferentially continuous, that is, they are unnotched. They are of a diameter sufficient to cut the entire circumference of the bores 25 including both the arcuate sectors which were cut in the first stage of broaching by broach 11 as well as the ridges 76 at least partially cut by the cutting teeth 94 of the first cutting section 86 of the broach 80 (see FIG. 10D).

The third cutting section 90 is in this instance a burnishing section and has a plurality of axially spaced circumferentially extending circular burnishing teeth 100 which are circumferentially continuous and dimensioned to pack or compress the material of the bore that has been broached.

In the second stage of operation, the guides employed in the first stage are removed, or alternatively, the bearing block is moved to a different location where there are no guides. The broach 80 is drawn through the bearing bores 25 and broaches them in sequence. The front piloting section 82 and the pilot teeth 96 in the first cutting section 86 have a close sliding fit with those arcuate sectors of the bores which were broached in the first stage by broach 11. The cutting teeth 94 in the first section 86 cut away most or much if not all of the ridges 76 left in the first stage of broaching (see FIG. 10C). Thereafter, a final finishing cut is taken by the cutting teeth 89 in the second cutting section 88 throughout a full 360°, after which the burnishing teeth 100 pack or compress the broached material of the bores. (see FIG. 10D).

The rear guiding section 84 is dimensioned to have a close sliding fit in the completely broached bores.

What is claimed is:

1. Apparatus for broaching a series of axially aligned bores comprising an elongated broach, a plurality of broach guides aligned with said bores, each broach guide having means for guiding said broach, and means for longitudinally advancing said broach through said bores and broach guide means in sequence so that said broach guide means guide the path of said broach and said broach broaches said bores, said guide means for each broach guide comprising a plurality of ribs arranged in arcuately spaced relation about an axis coinciding with the aligned axes of said bores, said broach having longitudinally extending grooves which slidably receive said ribs when said broach is advanced.

2. Apparatus for broaching a series of axially aligned bores comprising an elongated broach, means for longitudinally advancing said broach through said bores in sequence to broach said bores, and means for guiding said broach as it is advanced, said guide means comprising a plurality of ribs arranged in arcuately spaced relation about an axis coinciding with the aligned axes of said bores, said broach having longitudinally extending grooves which slidably receive said ribs when said broach is advanced.

3. Apparatus for broaching a series of axially aligned and spaced bores comprising an elongated broach, means for longitudinally advancing said broach through said bores in sequence to broach said bores, a plurality of broach guides, one of said broach guides being disposed in each space between said bores, each guide having a plurality of ribs arranged in arcuately spaced relation about an axis coinciding with the aligned axes of said bores, said broach having longitudinally extending grooves which receive said ribs to be guided thereby when said broach is advanced.

4. A plural stage method of broaching a series of axially aligned bores, said method comprising in a first stage:
providing a first elongated broach having a plurality of axially spaced, circumferentially extending cutting teeth and a plurality of arcuately spaced, longitudinally extending grooves which cross the cutting teeth and divide the cutting teeth into arcuate segments,
providing a plurality of broach guides each having a plurality of ribs arranged in the same arcuately spaced relation as said grooves about an axis coinciding with the aligned axes of the bores,
advancing said first broach through said bores and said guides with said ribs slidably received in said grooves to guide said broach and said cutting teeth segments broaching arcuately spaced sectors of said bores but leaving unbroached ridges therebetween,
said method further comprising in a second stage:
providing a second elongated broach having a plurality of axially spaced cutting teeth,
and advancing said second broach through said bores to broach the ridges left in said first stage.

5. A method as defined in claim 4, wherein said bores are axially spaced apart, and one of said broach guides is disposed in each space between said bores.

6. A method as defined in claim 5, wherein said second broach is provided with pilot means to guide on the arcuately spaced sectors of said bores which were broached in the first broaching stage.

7. A method as defined in claim 5, wherein said second broach has a plurality of axially spaced pilot teeth to guide on the arcuately spaced sectors of said bores which were broached in the first broaching stage, said pilot teeth having reliefs to clear said ridges, and cutting teeth on said second broach disposed in the spaces between said pilot teeth dimensioned to clear said arcuately spaced sectors of said bores and to broach said ridges.

8. A method as defined in claim 7, wherein said second broach has second cutting teeth behind said first-mentioned cutting teeth for broaching the entire circumference of said bores.

9. Apparatus for broaching a series of axially aligned and spaced bores comprising:
a first elongated broach for broaching in an initial operation, said first broach having a plurality of axially spaced, circumferentially extending cutting teeth and a plurality of arcuately spaced, longitudinally extending grooves which cross the cutting teeth and divide the cutting teeth into arcuate segments,
guide means for said first broach, said guide means comprising a plurality of guides, each guide having a plurality of ribs arranged in the same arcuately spaced relation as said grooves about an axis coinciding with the aligned axes of said bores,
means for advancing said first broach through said bores with said ribs slidably received in said grooves to guide said first broach and said cutting segments broaching arcuately spaced sectors of said bores but leaving unbroached ridges therebetween,
a second elongated broach for broaching in a subsequent operation,
and means for advancing said second broach through said bores to broach the ridges left by the first broach.

10. Apparatus as defined in claim 9, wherein said second broach has pilot means for piloting on the arcuately spaced sectors of said bores broached by said first broach.

11. Apparatus as defined in claim 9, wherein said second broach has a plurality of pilot teeth for piloting on the arcuately spaced sectors of said bores broached by said first broach, said pilot teeth having reliefs to clear said ridges, and said second broach also having first cutting teeth dimensioned to clear said arcuately spaced sectors of said bores and to broach said ridges.

12. Apparatus as defined in claim 11, wherein said pilot teeth are axially spaced apart along the length of said second broach and said first cutting teeth are respectively interposed in the spaces between said pilot teeth.

13. Apparatus as defined in claim 12, wherein said second broach also has second cutting teeth behind said first cutting teeth dimensioned to cut the entire circumference of said bores.

14. Apparatus for broaching a series of axially aligned and spaced bores comprising:
a first elongated broach for broaching in an initial operation, said first broach having a plurality of axially spaced, circumferentially extending cutting teeth, each cutting tooth being divided into arcuate segments with spaces between said segments, the arcuate segments of each cutting tooth being longitudinally aligned with the arcuate segments of the other cutting teeth, means for advancing said first broach through said bores with said arcuate segments broaching arcuately spaced sectors of said bores but leaving unbroached ridges therebetween,
a second elongated broach for broaching in a subsequent operation,
and means for advancing said second broach through said bores to broach the ridges left by the first broach, said second broach having pilot means for piloting on the arcuately spaced sectors of said bores broached by said first broach.

15. Apparatus for broaching a series of axially aligned and spaced bores comprising:
a first elongated broach for broaching in an initial operation, said first broach having a plurality of axially spaced, circumferentially extending cutting teeth, each cutting tooth being divided into arcuate segments with spaces between said segments, the arcuate segments of each cutting tooth being longitudinally aligned with the arcuate segments of the other cutting teeth, means for advancing said first broach through said bores with said arcuate segments broaching arcuately spaced sectors of said bores but leaving unbroached ridges therebetween, a second elongated broach for broaching in a subsequent operation, and means for advancing said second broach through said bores to broach the ridges left by the first broach, said second broach having a plurality of pilot teeth for piloting on the arcuately spaced sectors of said bores broached by said first broach, said pilot teeth having reliefs to clear said ridges, and said second broach also having first cutting teeth dimensioned to clear said arcuately spaced sectors of said bores and to broach said ridges.

16. Apparatus as defined in claim 15, wherein said pilot teeth are axially spaced apart along the length of said second broach and said first cutting teeth are respectively interposed in the spaces between said pilot teeth.

17. Apparatus as defined in claim 16, wherein said second broach also has second cutting teeth behind said first cutting teeth dimensioned to cut the entire circumference of said bores.

18. A plural stage method of broaching a series of axially aligned bores, said method comprising in a first stage:

providing a first elongated broach having a plurality of axially spaced, circumferentially extending cutting teeth, each cutting tooth being divided into arcuate segments with spaces between said segments, the arcuate segments of each cutting tooth being longitudinally aligned with the arcuate segments of the other cutting teeth, advancing said first broach through said bores and with said cutting teeth segments broaching arcuately spaced sectors of said bores but leaving unbroached ridges therebetween, said method further comprising in a second stage:
providing a second elongated broach having a plurality of axially spaced cutting teeth, and advancing said second broach through said bores to broach the ridges left on said first stage, said second broach being provided with pilot means to guide on the arcuately spaced sectors of said bores which were broached in the first broaching stage.

19. A plural stage method of broaching a series of axially aligned bores, said method comprising in a first stage:

providing a first elongated broach having a plurality of axially spaced, circumferentially extending cutting teeth, each cutting tooth being divided into arcuate segments with spaces between said segments, the arcuate segments of each cutting tooth being longitudinally aligned with the arcuate segments of the other cutting teeth, advancing said first broach through said bores and with said cutting teeth segments broaching arcuately spaced sectors of said bores but leaving unbroached ridges therebetween, said method further comprising in a second stage:
providing a second elongated broach having a plurality of axially spaced cutting teeth, and advancing said second broach through said bores to broach the ridges left on said first stage, said second broach having a plurality of axially spaced pilot teeth to guide on the arcuately spaced sectors of said bores which were broached in the first broaching stage, said pilot teeth having reliefs to clear said ridges, and cutting teeth on said second broach dimensioned to clear said arcuately spaced sectors of said bores and to broach said ridges.

20. A method as defined in claim 19, wherein said second broach has second cutting teeth behind said first-mentioned cutting teeth for broaching the entire circumference of said bores.

21. In apparatus for cutting a series of axially aligned and spaced bores wherein in a first stage arcuate sectors of said bores are removed leaving ridges therebetween after which said ridges are removed in a second stage, said apparatus comprising:

an elongated broach for removing said ridges in the second stage, said broach having pilot means for piloting on the arcuate sectors of said bores removed in the first stage, said pilot means comprising a plurality of pilot teeth for piloting on the arcuate sectors, said pilot teeth having reliefs for clearing said ridges, and said broach having first cutting teeth dimensioned to clear said arcuate sectors and to broach said ridges.

22. Apparatus as defined in claim 21, wherein said pilot teeth are axially spaced apart along the length of said broach and said first cutting teeth are respectively interposed in the spaces between said pilot teeth.

23. Apparatus as defined in claim 22, wherein said broach also has second cutting teeth behind said first cutting teeth dimensioned to cut the entire circumference of the bores.

* * * * *